(12) United States Patent
Slaughter

(10) Patent No.: US 7,866,377 B2
(45) Date of Patent: *Jan. 11, 2011

(54) METHOD OF USING MINIMAL SURFACES AND MINIMAL SKELETONS TO MAKE HEAT EXCHANGER COMPONENTS

(75) Inventor: Victor Blakemore Slaughter, Manchester, MO (US)

(73) Assignee: The Boeing Company, Chicago, IL (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/643,378

(22) Filed: Dec. 20, 2006

(65) Prior Publication Data

US 2008/0149299 A1  Jun. 26, 2008

(51) Int. Cl.
*F28D 19/00*  (2006.01)
(52) U.S. Cl. .................................. 165/148; 700/120
(58) Field of Classification Search ................. 165/148, 165/152, 153; 430/269; 700/120
See application file for complete search history.

(56) References Cited

U.S. PATENT DOCUMENTS

| | | | |
|---|---|---|---|
| 4,915,164 A | | 4/1990 | Harper |
| 5,746,844 A | * | 5/1998 | Sterett et al. ................. 148/522 |
| 6,112,804 A | * | 9/2000 | Sachs et al. .................. 164/348 |
| 6,122,564 A | * | 9/2000 | Koch et al. ................... 700/123 |
| 6,146,426 A | * | 11/2000 | Doyle ....................... 623/23.58 |
| 6,221,463 B1 | | 4/2001 | White |
| 6,391,251 B1 | * | 5/2002 | Keicher et al. ................. 419/7 |
| 6,623,687 B1 | | 9/2003 | Gervasi et al. |
| 6,751,516 B1 | * | 6/2004 | Richardson ................. 700/119 |
| 6,940,037 B1 | * | 9/2005 | Kovacevic et al. ...... 219/121.64 |
| 2002/0102674 A1 | * | 8/2002 | Anderson ................... 435/174 |
| 2004/0191106 A1 | * | 9/2004 | O'Neill et al. ................. 419/2 |
| 2005/0221150 A1 | * | 10/2005 | Revol .......................... 429/38 |
| 2006/0249875 A1 | | 11/2006 | Robb et al. |

OTHER PUBLICATIONS

Rajagopalan, Srinivasan et al., "Schwarz meets Schwann: Design and fabrication of biomorphic and durataxic tissue engineering scaffolds", Medical Image Analysis 10 (2006) 693-712.
Jung, Y. et al, "Fluid permeabilities of triply periodic minimal surfaces", Physical Review E 72, 056319 (2005).

* cited by examiner

*Primary Examiner*—Teresa J Walberg

(57) ABSTRACT

A method of using a minimal surface or a minimal skeleton to make a heat exchanger component is provided. The method comprises the steps of generating a stereolithography file from design data, slicing the stereolithography file into two-dimensional patterns, repeating the two-dimensional patterns sequentially to produce a three-dimensional minimal surface component or minimal skeleton component, and depositing at least one layer of a material having a high thermal conductivity onto a top surface of a base, wherein the deposited material forms either a three-dimensional minimal surface component or a three-dimensional minimal skeleton component. Also provided are the heat exchanger components made by the embodiments of the method using either minimal surfaces or minimal skeletons.

14 Claims, 3 Drawing Sheets

FIG. 12
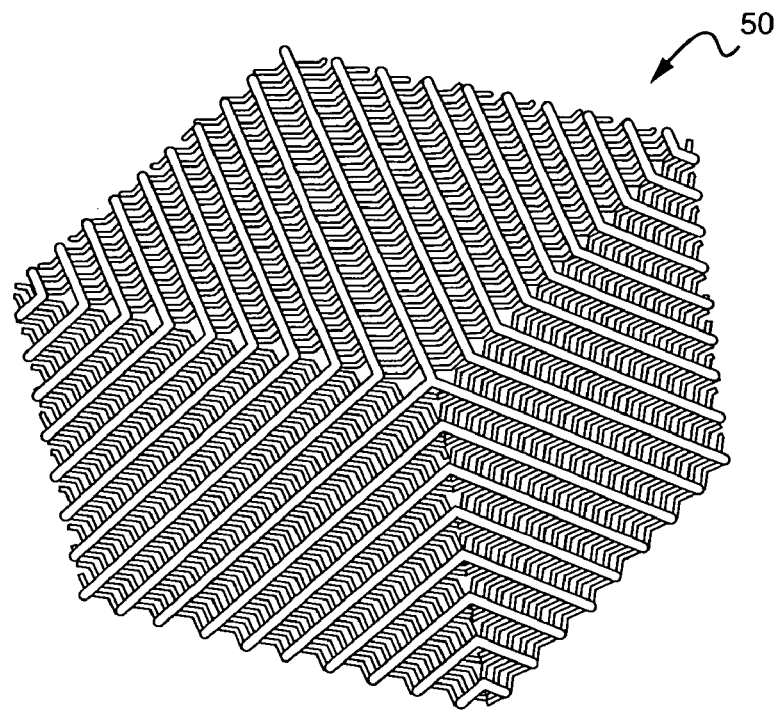
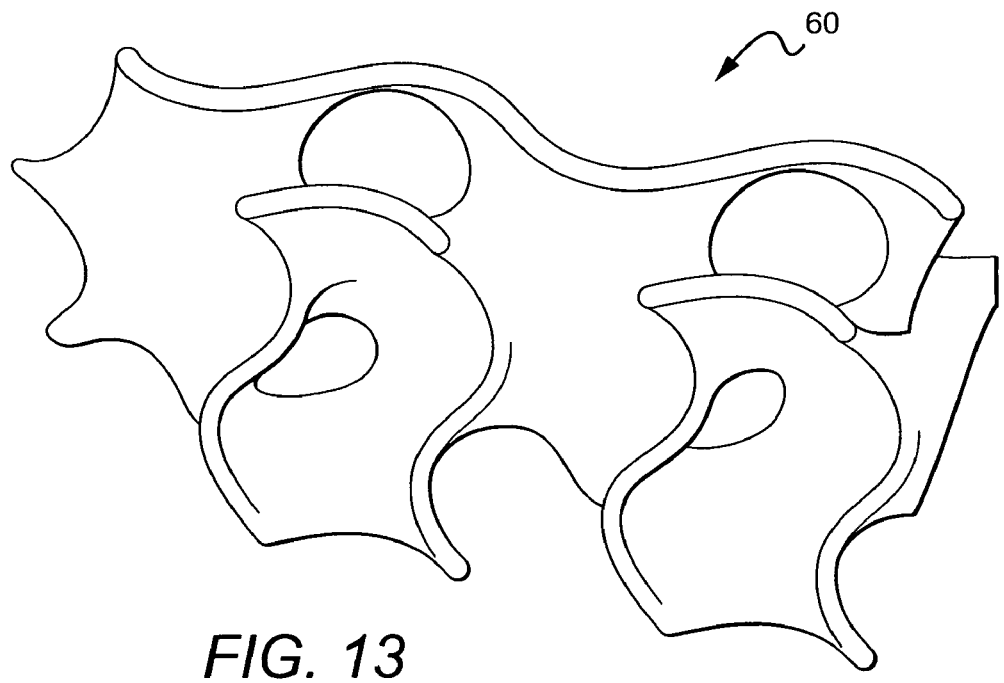
FIG. 13

METHOD OF USING MINIMAL SURFACES AND MINIMAL SKELETONS TO MAKE HEAT EXCHANGER COMPONENTS

BACKGROUND OF THE INVENTION

1) Field of the Invention

A method of using minimal surfaces and minimal skeletons to make heat exchanger components is provided. More particularly, a method of using minimal surfaces and minimal skeletons to make heat exchanger components by an additive process is provided.

2) Description of Related Art

Known heat exchangers are devices built for efficient heat transfer from one fluid to another, whether the fluids are separated by a solid wall so that they never mix, or the fluids are directly contacted. Heat exchangers are typically used in refrigeration, air conditioning, space heating, electricity generation, and chemical processing. Heat exchangers are of particular use in the aerospace and automobile industries. For efficiency, heat exchangers are designed to maximize the surface area of the wall between the two fluids, while minimizing resistance to fluid flow through the exchanger. The heat exchanger's performance can also be affected by the addition of fins or corrugations in one or both directions, which increase surface area and may channel fluid flow or induce turbulence. Optimized devices are known as compact heat exchangers. Compact heat exchangers are complex structures with delicate components. The nature of the compact heat exchanger drives the cost of manufacture and cost of quality to high levels. Known methods of manufacturing heat exchangers and compact heat exchangers involve complex assembly and difficult attachment, brazing, soldering, or welding operations of the various parts of the heat exchangers, including but not limited to, the core, the exterior, base plates, interfacing flanges, fins, and manifolds. Known heat exchangers are typically of a thin foil construction and require brazing or a similar process to connect the pieces together. The cost of manufacturing heat exchangers and compact heat exchangers using known methods is high due to the complex assembly operations and maintenance of tools to conduct the assembly operations.

Known methods of making heat exchangers and compact heat exchangers often employ fins and other structures to transfer heat to the base plates of the heat exchangers. However, these structures divide or isolate the fluids or volumes involved in the process and often increase the amount of surface area separating the fluids or volumes. The greater the amount of surface area or walls separating the fluids or volumes, the less efficient the heat transfer in the heat exchanger is because the heat must transfer across a wall to a fin to a wall and so on. Moreover, known methods of making heat exchangers that isolate numerous separate volumes may have problems with pressure equalization.

A minimal surface is a surface that is local area-minimizing, that is, a small piece has the smallest possible area for a surface spanning the boundary of that piece. Minimal surfaces necessarily have zero mean curvature, i.e. the sum of the principal curvatures at each point is zero. Examples of minimal surfaces include catenoids and helicoids. A minimal surface made by rotating a catenary once around the axis is called a catenoid. A surface swept out by a line rotating with uniform velocity around an axis perpendicular to the line and simultaneously moving along the axis with uniform velocity is called a helicoid. Some minimal surfaces are triply periodic, that is, they have a crystalline structure and they repeat themselves in three dimensions. Many triply periodic minimal surfaces are known. A minimal skeleton is the reverse of a minimal surface. A minimal skeleton is the end result of expanding or shrinking a surface along the direction of its normal vectors, while avoiding any pinching off that would change the topology of the surface, until all that remains is a connected graph of arcs and nodes. Some minimal skeletons are triply periodic as well. There are no known methods of using these minimal surfaces and minimal skeletons to make heat exchanger components.

Accordingly, there is a need for a method of using minimal surfaces and minimal skeletons to make heat exchanger components that does not have the problems associated with known methods of making heat exchanger components.

SUMMARY OF THE INVENTION

This need for a method of using minimal surfaces and minimal skeletons to make heat exchanger components that does not have the problems associated with known methods, as well as a unique, nonobvious, and advantageous method, is satisfied. None of the known methods provides all of the numerous advantages discussed herein. Unlike known methods, an embodiment of the method of using minimal surfaces and minimal skeletons to make heat exchanger components may provide one or more of the following advantages: minimizes the amount of materials or walls separating the fluids or volumes in the heat exchanger; reduces manufacturing cost and improves efficiency; improves pressure equalization; provides good flow properties in the heat exchanger or compact heat exchanger; self regulates flow and temperature; uses minimal surfaces which by their nature separates two volumes; uses an embodiment of minimal surfaces which is triply periodic, that is, it may be repeated continuously in three directions; provides two volumes regardless of the size of the heat exchanger component made; applies additive manufacturing techniques to grow heat exchanger and compact heat exchanger components; the use of an additive process enables the use of more complex geometries in the heat exchanger assembly when needed; easily and simply grows or builds the heat exchanger or compact heat exchanger components in one piece; eliminates complex assembly operations and maintenance of tools; provides the ability to manufacture complex monolithic structures as an alternative to brazing intense assemblies; uses the as-deposited surface finish on most faces of the heat exchanger components; allows for customization of the heat exchanger components; and, does not require intensive finishing or full machining after the heat exchanger or compact heat exchanger components are formed.

In an embodiment of the invention, there is provided method of using a minimal surface to make a heat exchanger component, the method comprising the steps of: generating a stereolithography file from design data; slicing the stereolithography file into two-dimensional patterns; repeating the two-dimensional patterns sequentially to produce a three-dimensional minimal surface component; and, depositing at least one layer of a material having a high thermal conductivity onto a top surface of a base, wherein the deposited material forms the three-dimensional minimal surface component. In another embodiment there is provided a heat exchanger component made by the method of this embodiment wherein the component comprises a triply periodic design that is repeated in three dimensions.

In another embodiment of the invention, there is provided a method of using a minimal skeleton to make a heat exchanger component, the method comprising the steps of: generating a stereolithography file from design data; slicing the stereolithography file into two-dimensional patterns; repeating the two-dimensional patterns sequentially to produce a three-dimensional minimal skeleton component; and, depositing at least one layer of a material having a high thermal conductivity onto a top surface of a base, wherein the deposited material forms the three-dimensional minimal skeleton component. In another embodiment, there is provided a heat exchanger component made by the method of this embodiment wherein the component comprises a triply periodic design that is repeated in three dimensions.

BRIEF DESCRIPTION OF THE DRAWINGS

The foregoing and other advantages and features, and the manner in which the same are accomplished, will become more readily apparent upon consideration of the following detailed description taken in conjunction with the accompanying drawings which illustrate preferred and exemplary embodiments, but which are not necessarily drawn to scale, wherein:

FIG. 12 shows a level representation of a minimal skeleton core component; and,

FIG. 13 shows a level representation of a minimal surface core component.

DETAILED DESCRIPTION OF THE INVENTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art. Like numbers refer to like elements throughout.

Figure 1:
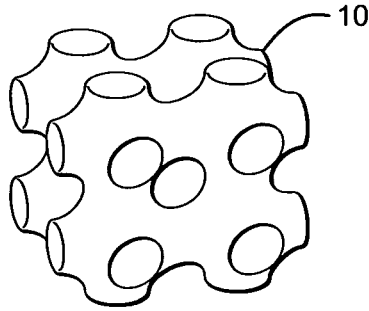
FIG. 1 shows a first embodiment of a prior art minimal surface core component of a heat exchanger.
Figure 2:
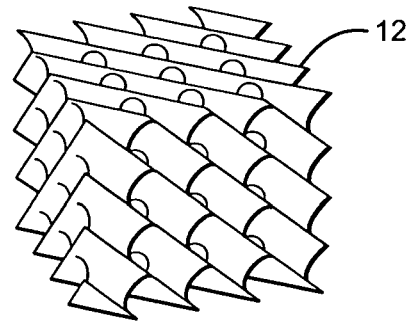
FIG. 2 shows a second embodiment of a prior art minimal surface core component of a heat exchanger.
Figure 3:
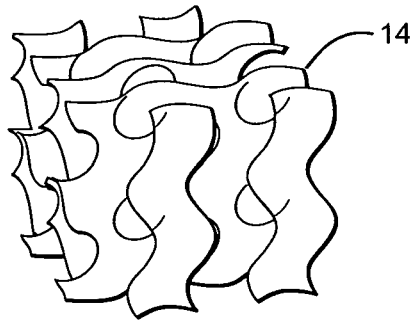
FIG. 3 shows a third embodiment of a prior art minimal surface core component of a heat exchanger.
Figure 4:
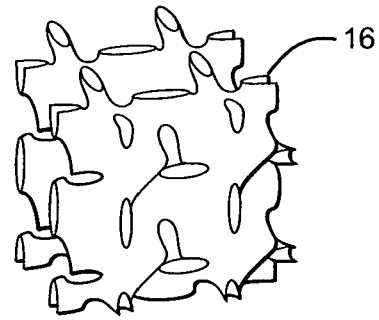
FIG. 4 shows a fourth embodiment of a prior art minimal surface core component of a heat exchanger.
Figure 5:
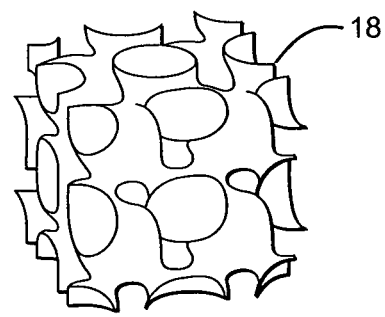
FIG. 5 shows a fifth embodiment of a prior art minimal surface core component of a heat exchanger.
Figure 6:
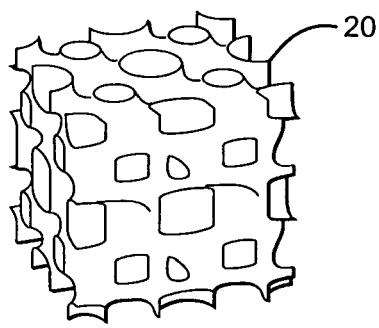
FIG. 6 shows a sixth embodiment of a prior art minimal surface core component of a heat exchanger.
Figure 7:
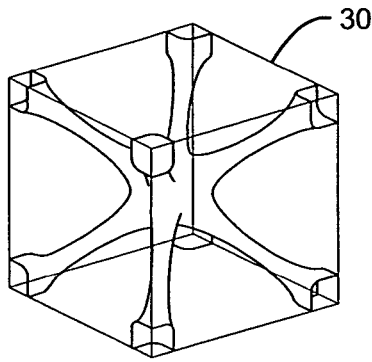
FIG. 7 shows a first embodiment of a prior art minimal skeleton core component of a heat exchanger.
Figure 8:
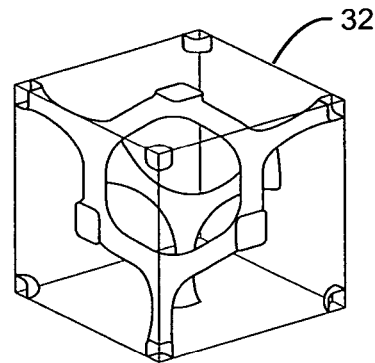
FIG. 8 shows a second embodiment of a prior art minimal skeleton core component of a heat exchanger.
Figure 9:
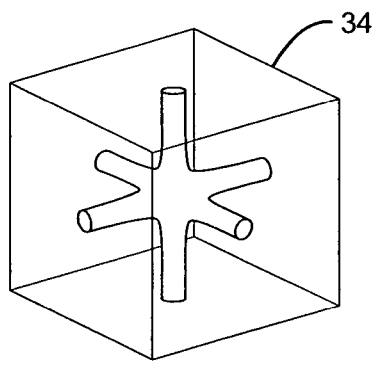
FIG. 9 shows a third embodiment of a prior art minimal skeleton core component of a heat exchanger.
Figure 10:
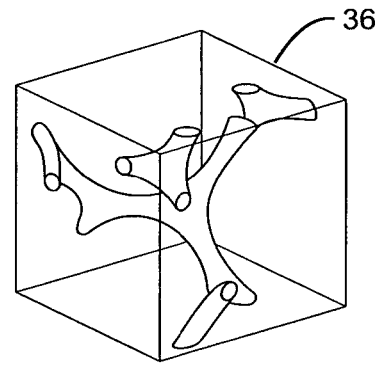
FIG. 10 shows a fourth embodiment of a prior art minimal skeleton core component of a heat exchanger.

Referring now to the figures, FIG. 1 shows a first embodiment 10 of a prior art minimal surface core component of a heat exchanger. FIG. 2 shows a second embodiment 12 of a prior art minimal surface core component of a heat exchanger. FIG. 3 shows a third embodiment 14 of a prior art minimal surface core component of a heat exchanger. FIG. 4 shows a fourth embodiment 16 of a prior art minimal surface core component of a heat exchanger. FIG. 5 shows a fifth embodiment 18 of a prior art minimal surface core component of a heat exchanger. FIG. 6 shows a sixth embodiment 20 of a prior art minimal surface core component of a heat exchanger. FIG. 7 shows a first embodiment 30 of a prior art minimal skeleton core component of a heat exchanger. FIG. 8 shows a second embodiment 32 of a prior art minimal skeleton core component of a heat exchanger. FIG. 9 shows a third embodiment 34 of a prior art minimal skeleton core component of a heat exchanger. FIG. 10 shows a fourth embodiment 36 of a prior art minimal skeleton core component of a heat exchanger.

An embodiment of a method of the invention is provided for using a minimal surface to make a heat exchanger component. The embodiment of the method may be used to make a heat exchanger component or a compact heat exchanger component. Preferably, the heat exchanger component or compact heat exchanger component is a core component. However, the embodiment of the method may also be used to make heat exchanger components or compact heat exchanger components, such as a plate, an exterior, interfacing flanges, fins, and manifolds. Preferably, the method uses the minimal surface to make a heat exchanger component by an additive process, and more preferably, by an additive deposition process or a metallic additive process. Preferably, the additive deposition process is a shape metal deposition process that may use an electron beam gun or a laser and a powdered metal, metal alloy, or composite material. However, other suitable additive processes may be used. Preferably, the heat exchanger or compact heat exchanger formed is a plate heat exchanger composed of multiple, thin, slightly-separated plates that have large surface areas and fluid flow passages for heat transfer.

The embodiment of this method comprises the step of generating a stereolithography file from design data such as computer aided design (CAD) data. The heat exchanger component or compact heat exchanger component is first designed in a three-dimensional computer aided design (CAD) program. The embodiment of this method further comprises the step of slicing the stereolithography file into two-dimensional patterns. The program file is transferred to a pre-processing software where the model is sliced into thin layers. Preferably, the pre-processing software used is a software such as Magics RP obtained from Materialise of Belgium. The embodiment of this method further comprise the step of repeating the two-dimensional patterns sequentially to produce a three-dimensional minimal surface component.

Figure 11:
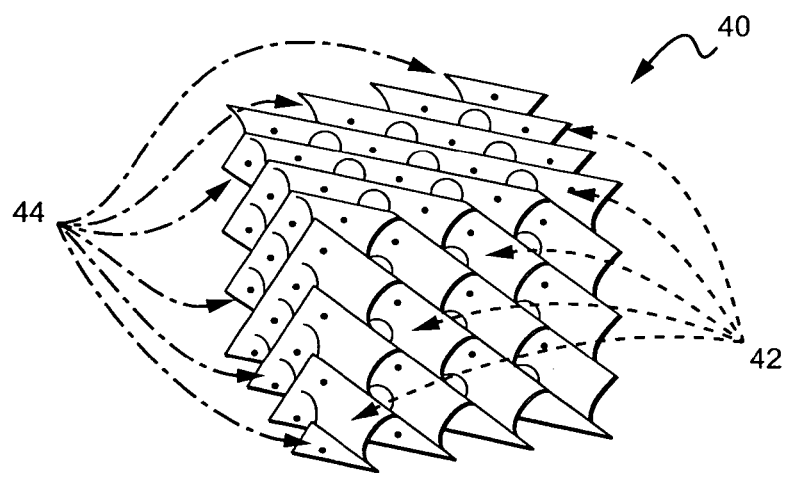
FIG. 11 shows a volume separation of an embodiment of a minimal surface core component of a heat exchanger.

The embodiment of this method further comprises the step of depositing at least one layer of a material having a high thermal conductivity onto a top surface of a base, and preferably a portion of a top surface of a base. The deposited material preferably forms a three-dimensional minimal surface component. Preferably, the three-dimensional minimal surface component isolates two volumes of fluids flowing through the heat exchanger component. As shown in FIG. 11, an embodiment of a minimal surface core 40 of a heat exchanger shows a first fluid volume 42 and shows a second fluid volume 44. FIG. 13 shows a level representation of a minimal surface core component 60. Both minimal surfaces and representations or level representations of minimal surfaces may be used in this embodiment of the invention. Level representations provide a close representation of the minimal surface without the high level of computation. Minimal surfaces, by their nature, separate two volumes of fluids that flow through the heat exchanger. This embodiment of the method isolates two volumes of fluids which improves pressure equalization and improves heat transfer since heat only needs to transfer across a single wall rather than transfer across a wall to a fin to a wall and so on. In contrast, the number of volumes in a conventional heat exchanger design increases with the number of layers in the heat exchanger structure. Preferably, the minimal surface is triply periodic. Preferably, the minimal surface has a mathematically based geometry. Preferably, the high thermal conductivity material deposited onto the base or substrate comprises carbon, titanium, silicon carbide, aluminum, vanadium, cobalt, chromium, copper, nickel, zinc, silicon nitride, boron carbide, boron nitride, hafnium carbide, and/or tungsten. However, other suitable high thermal conductivity materials may also be used. Preferably, the material has a thermal conductivity that is appropriate for the environmental and temperature conditions used in the embodiment of the method. Preferably, the thickness of the material layer deposited onto the base is in a range of about 0.001 inches thick to about 0.004 inches thick. The base may be comprised of the deposited material. Alternatively, the base is a substrate for the deposited material. Preferably, the base pattern is triply periodic in structure. This enables the component, such as the core component, to be tailored with features beneficial to the heat exchanger core component design. Preferably, the material is deposited seamlessly onto the base. In this embodiment of the method, the preferred deposition machine used is one such as the Arcam machine, model number EBM S12 system, obtained from Arcam AB of Sweden. However, other conventional deposition machines may also be used. The Arcam machine provides a free form fabrication technology for direct manufacturing of fully dense parts made of metal powder. The free form technology is based on electron beam melting, and parts are manufactured by melting metal powder and building up the parts layer by layer. The material is uniformly deposited onto the base or substrate with a rake-like device that is part of the Arcam machine.

The embodiment of the method may further comprise the step after the depositing step of repeating the depositing step for each of a plurality of additional material layers. The embodiment of the method may further comprise the step, before the depositing step, of heating the base with a heating component. Preferably, the heating component used to heat the base is an electron beam gun. However, the heating component may also comprise a laser or other suitable heating component. Preferably, the base is a substrate or start plate made of a metal or metal alloy such as titanium, aluminum, vanadium, cobalt, chromium, copper, nickel, tungsten, or another suitable metal or metal alloy. However, if the base is made of the deposited material, preferably, the deposited material is a metal, metal alloy, or foam material, such as carbon, titanium, silicon carbide, aluminum, vanadium, cobalt, chromium, copper, nickel, zinc, silicon nitride, boron carbide, boron nitride, hafnium carbide, and/or tungsten. Preferably, the thickness of the base or substrate may be between about one-quarter inch to about two inches. However, other suitable thicknesses may also be used. Preferably, the depth and width of the base or substrate are both less than eight inches. However, typically, the size and dimension of the base or substrate is dependent on the predetermined heat exchanger to be grown and obtained. The base or substrate are first designed in a three-dimensional CAD (computer aided design) program. The program file is then transferred to a pre-processing software where the model is sliced into thin layers. Preferably, the base or substrate is heated to a first temperature in the range of about 650 degrees Celsius to about 750 degrees Celsius. However, the heat of the first temperature may be dependent on the material being deposited, and another suitable first temperature may be used.

The embodiment of the method may further comprise the step of melting the high thermal conductivity material layer at a second temperature with a heating component to grow the heat exchanger or compact heat exchanger component. Preferably, the heating component used to melt the high thermal conductivity material is the same electron beam gun that is used to heat the base or substrate. However, the heating component may also comprise a laser or other suitable heating component. The electron beam gun may be a part of the Arcam machine. The electron beam gun is preferably used in a vacuum chamber which provides a high power process and a good environment, resulting in superior material characteristics. A vacuum chamber is preferred so that the electrons have a clear path to the metal. Further, the vacuum provides a good thermal environment, leading to good form stability and controlled thermal balance in the part. Preferably, the vacuum chamber or build chamber is about 250 millimeters long, by 250 millimeters wide, by 250 millimeters high. However, the vacuum chamber may also be larger in size. Preferably, the second temperature is greater than 2000 degrees Celsius and is at a heat suitable for melting the metal or metal alloy layer.

The embodiment of this method may further comprise the step after a final depositing step of cooling the heat exchanger component, if heat is used with the embodiment of the method. The formed heat exchanger component or compact heat exchanger component may be cooled with helium, argon, or another suitable cooling agent for an effective period of time. Preferably, the time to complete the steps of the embodiment of the method for making a one-layer compact heat exchanger component is less than several minutes. However, the time to make the heat exchanger component or compact heat exchanger component depends on the size of the heat exchanger component or compact heat exchanger component desired. The larger the heat exchanger component or compact heat exchanger component desired, the longer the time to make the heat exchanger component or compact heat exchanger component. The smaller the heat exchanger component or compact heat exchanger component, the shorter the time to make the heat exchanger component or compact heat exchanger component. Regardless of the size of the heat exchanger component created, such as the core component, there are still only two fluid volumes. With the embodiment of the method there is no separate assembly required to connect the core to the exterior of the heat exchanger. Preferably, the heat exchanger component or compact heat exchanger component formed has an acceptable surface roughness and resolution. The finer the layer of material, the better the surface resolution of the heat exchanger component or compact heat exchanger component formed. The heat exchanger component or compact heat exchanger component may be finished upon completion of the build. Another embodiment provided is for a heat exchanger component made by the embodiment of this method using minimal surfaces. Preferably, the component comprises a triply periodic design that is repeated in three dimensions.

Another embodiment of a method of the invention is provided. This embodiment uses a minimal skeleton to make a heat exchanger component. The embodiment of the method may be used to make a heat exchanger component or a compact heat exchanger component. Preferably, the heat exchanger or compact heat exchanger component is a core component. Preferably, the heat exchanger component or compact heat exchanger component is a core component. However, the embodiment of the method may also be used to make heat exchanger components or compact heat exchanger components, such as a plate, an exterior, interfacing flanges, fins, and manifolds. Preferably, the embodiment of this method uses the minimal skeleton to make a heat exchanger component by an additive process, and more preferably, by an additive deposition process or a metallic additive process. Preferably, the additive deposition process is a shape metal deposition process that may use an electron beam gun or a laser and a powdered metal, metal alloy, or composite material. However, other suitable additive processes may be used. Preferably, the heat exchanger or compact heat exchanger formed is a plate heat exchanger composed of multiple, thin, slightly-separated plates that have large surface areas and fluid flow passages for heat transfer.

The embodiment of this method comprises the step of generating a stereolithography file from design data, such as computer aided design (CAD). The heat exchanger component or compact heat exchanger component is first designed in a three-dimensional CAD (computer aided design) program. The embodiment of this method further comprises the step of slicing the stereolithography file into two-dimensional patterns. The program file is transferred to a pre-processing software where the model is sliced into thin layers. Preferably, the pre-processing software used is a software such as Magics RP obtained from Materialise of Belgium. The embodiment of this method further comprise the step of repeating the two-dimensional patterns sequentially to produce a three-dimensional minimal skeleton component.

The embodiment further comprises the step of depositing at least one layer of a material having a high thermal conductivity onto a top surface of a base, and preferably a portion of a top surface of a base. The deposited material preferably forms a three-dimensional minimal skeleton component. Preferably, the three-dimensional minimal skeleton component is immersed or sits in a phase change material or a fluid flowing through the heat exchanger component. FIG. 12 shows a level representation of a minimal skeleton core component 50. Both minimal skeletons and representations or level representations of minimal skeletons may be used in this embodiment of the invention. Level representations provide a close representation of the minimal skeleton without the high level of computation. Preferably, the minimal skeleton is triply periodic. Preferably, the minimal skeleton has a mathematically based geometry. Preferably, the material comprises carbon, titanium, silicon carbide, aluminum, vanadium, cobalt, chromium, copper, nickel, zinc, silicon nitride, boron carbide, boron nitride, hafnium carbide, and/or tungsten. However, other suitable high thermal conductivity materials may also be used. Preferably, the material has a thermal conductivity that is appropriate for the environmental and temperature conditions used in the embodiment of the method. Preferably, the thickness of the material layer deposited onto the base is in a range of about 0.001 inches thick to about 0.004 inches thick. The base may be comprised of the deposited material. Alternatively, the base is a substrate for the deposited material. Preferably, the base pattern is triply periodic in structure. This enables the component, such as the core component, to be tailored with features beneficial to the heat exchanger core component design. Preferably, the material is deposited seamlessly onto the base. In this embodiment of the method, the preferred deposition machine used is one such as the Arcam machine, model number EBM S12 system, discussed above. However, other conventional deposition machines may also be used.

The embodiment of the method may further comprise the step after the depositing step of repeating the depositing step for each of a plurality of additional material layers. The embodiment of the method may further comprise the step, before the depositing step, of heating the base with a heating component. Preferably, the heating component used to heat the base is an electron beam gun. However, the heating component may also comprise a laser or other suitable heating component. Preferably, the base is a substrate or start plate made of a metal or metal alloy such as titanium, aluminum, vanadium, cobalt, chromium, copper, nickel, tungsten, or another suitable metal or metal alloy. However, if the base is made of the deposited material, preferably, the deposited material is a metal, metal alloy, or foam material, such as carbon, titanium, silicon carbide, aluminum, vanadium, cobalt, chromium, copper, nickel, zinc, silicon nitride, boron carbide, boron nitride, hafnium carbide, and/or tungsten. Preferably, the thickness of the base or substrate may be between about one-quarter inch to about two inches. However, other suitable thicknesses may also be used. Preferably, the depth and width of the base or substrate are both less than eight inches. However, typically, the size and dimension of the base or substrate is dependent on the predetermined heat exchanger to be grown and obtained. The base or substrate are first designed in a three-dimensional CAD (computer aided design) program. The program file is then transferred to a pre-processing software where the model is sliced into thin layers. Preferably, the base or substrate is heated to a first temperature in the range of about 650 degrees Celsius to about 750 degrees Celsius. However, the heat of the first temperature may be dependent on the material being deposited, and another suitable first temperature may be used.

The embodiment of the method may further comprise the step of melting the high thermal conductivity material layer at a second temperature with a heating component to grow the heat exchanger or compact heat exchanger component. Preferably, the heating component used to melt the high thermal conductivity material is the same electron beam gun that is used to heat the base or substrate. However, the heating component may also comprise a laser or other suitable heating component. The electron beam gun may be a part of the Arcam machine. The electron beam gun is preferably used in a vacuum chamber as discussed above. Preferably, the second temperature is greater than 2000 degrees Celsius and is at a heat suitable for melting the metal or metal alloy layer.

The embodiment of this method may further comprise the step after a final depositing step of cooling the heat exchanger component, if heat is used with the embodiment of the method. The formed heat exchanger component or compact heat exchanger component may be cooled with helium, argon, or another suitable cooling agent for an effective period of time. Preferably, the time to complete the steps of the embodiment of the method for making a one-layer compact heat exchanger component is less than several minutes. However, the time to make the heat exchanger component or compact heat exchanger component depends on the size of the heat exchanger component or compact heat exchanger component desired. Regardless of the size of the heat exchanger component created, such as the core component, there are still only two fluid volumes. With the embodiment of this method there is no separate assembly required to connect the core to the exterior of the heat exchanger. Preferably, the heat exchanger component or compact heat exchanger component formed has an acceptable surface roughness and resolution. The finer the layer of material, the better the surface resolution of the heat exchanger component or compact heat exchanger component formed. The heat exchanger component or compact heat exchanger component may be finished upon completion of the build. Another embodiment provided is for a heat exchanger component made by the embodiment of this method using minimal skeletons. Preferably, the component comprises a triply periodic design that is repeated in three dimensions.

The embodiments of the method allow for improved flow properties in the heat exchanger or compact heat exchanger, and increased efficiency of the heat exchanger or compact heat exchanger, and also self regulate fluid flow and temperature. The complexity of the heat exchanger or component heat exchanger component made may also be tailored by selecting different minimal geometries. The minimal surface geometry or minimal skeleton geometry chosen affects the flow properties in the structures of the heat exchanger. An efficient heat exchanger design is where the fluid flow through the heat exchanger sections is opposite each other, such as 180 degrees.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed that modifications and other embodiments are intended to be included within the scope of the appended claims. Although specific terms are employed herein, they are used in a generic and descriptive sense only and not for purposes of limitation.

What is claimed is:

1. A method of using a minimal surface to make a one piece heat exchanger, the method comprising the steps of:
   generating a stereolithography file from design data;
   slicing the stereolithography file into two-dimensional patterns;
   repeating the two-dimensional patterns sequentially;
   heating a base with an electron beam gun;
   forming a one piece three-dimensional minimal surface heat exchanger having a zero mean curvature that does not require assembly of separate pieces, by depositing via electron beam deposition a plurality of layers of a material having a high thermal conductivity onto a top surface of the base, and forming a series of separated plates each having a plurality of rows of fins, forming a core interior portion, forming manifolds, and forming interfacing flanges for connecting the heat exchanger to an exterior; and,
   cooling the one piece heat exchanger with a cooling agent after all of the plurality of layers have been deposited and the one piece heat exchanger has been formed.

2. The method of claim 1 wherein the three-dimensional minimal surface heat exchanger isolates two volumes of fluids flowing through the heat exchanger.

3. The method of claim 1 wherein the minimal surface is triply periodic.

4. The method of claim 1 further comprising the step, after the forming step, of melting the plurality of layers of the high thermal conductivity material with the electron beam gun.

5. The method of claim 1 wherein the minimal surface has a mathematically based geometry.

6. The method of claim 1 wherein the material is selected from the group consisting essentially of carbon, titanium, silicon carbide, aluminum, vanadium, cobalt, chromium, copper, nickel, zinc, silicon nitride, boron carbide, boron nitride, hafnium carbide, and/or tungsten.

7. The method of claim 1 wherein the three-dimensional minimal surface heat exchanger component has a shape selected from the group consisting of a catenoid shape and a helicoid shape.

8. A method of using a minimal skeleton to make a one piece heat exchanger, the method comprising the steps of:
   generating a stereolithography file from design data;
   slicing the stereolithography file into two-dimensional patterns;
   repeating the two-dimensional patterns sequentially;
   heating a base with an electron beam gun;
   forming a one piece three-dimensional minimal skeleton heat exchanger that does not require assembly of separate pieces, by depositing via electron beam deposition a plurality of layers of a material having a high thermal conductivity onto a top surface of the base, and forming a series of separated plates each having a plurality of rows of fins, forming a core interior portion, forming manifolds, and forming interfacing flanges for connecting the heat exchanger to an exterior; and,
   cooling the one piece heat exchanger with a cooling agent after all of the plurality of layers have been deposited and the one piece heat exchanger has been formed.

9. The method of claim 8 wherein the three-dimensional minimal skeleton heat exchanger forms a plate heat exchanger composed of multiple, thin slightly-separated plates that have large surface areas and fluid flow passages for heat transfer.

10. The method of claim 8 wherein the minimal skeleton is triply periodic.

11. The method of claim 8 further comprising the step, after the forming step, of melting the plurality of layers of the high thermal conductivity material layer with the electron beam gun.

12. The method of claim 8 wherein the minimal skeleton has a mathematically based geometry.

13. The method of claim 8 wherein the material is selected from the group consisting essentially of carbon, titanium, silicon carbide, aluminum, vanadium, cobalt, chromium, copper, nickel, zinc, silicon nitride, boron carbide, boron nitride, hafnium carbide, and/or tungsten.

14. The method of claim 8 wherein the cooling agent is selected from the group consisting of helium and argon.

* * * * *